March 12, 1935. H. C. OTIS Re. 19,498

PROCESS AND APPARATUS FOR INSERTING TUBING IN WELLS

Original Filed Sept. 26, 1929 2 Sheets-Sheet 1

Inventor
Herbert C. Otis
by his Attorneys
Howson & Howson

March 12, 1935. H. C. OTIS Re. 19,498

PROCESS AND APPARATUS FOR INSERTING TUBING IN WELLS

Original Filed Sept. 26, 1929 2 Sheets-Sheet 2

Inventor:-
Herbert C. Otis
by his Attorneys
Howson + Howson

Reissued Mar. 12, 1935

Re. 19,498

UNITED STATES PATENT OFFICE 19,498

PROCESS AND APPARATUS FOR INSERTING TUBING IN WELLS

Herbert C. Otis, Dallas, Tex.

Original No. 1,894,912, dated January 17, 1933, Serial No. 395,315, September 26, 1929. Application for reissue October 1, 1934, Serial No. 747,923

17 Claims. (Cl. 166—15)

This invention relates to a process and apparatus for inserting tubing, tools or other objects into gas or oil wells against high pressure existing therein, whereby the loss of the gas or oil is prevented, and the insertion of the tubing more readily accomplished than has heretofore been possible.

The process and apparatus forming the subject matter of this application will be fully described hereinafter, reference being had to the accompanying drawings, of which:

Figure 1:
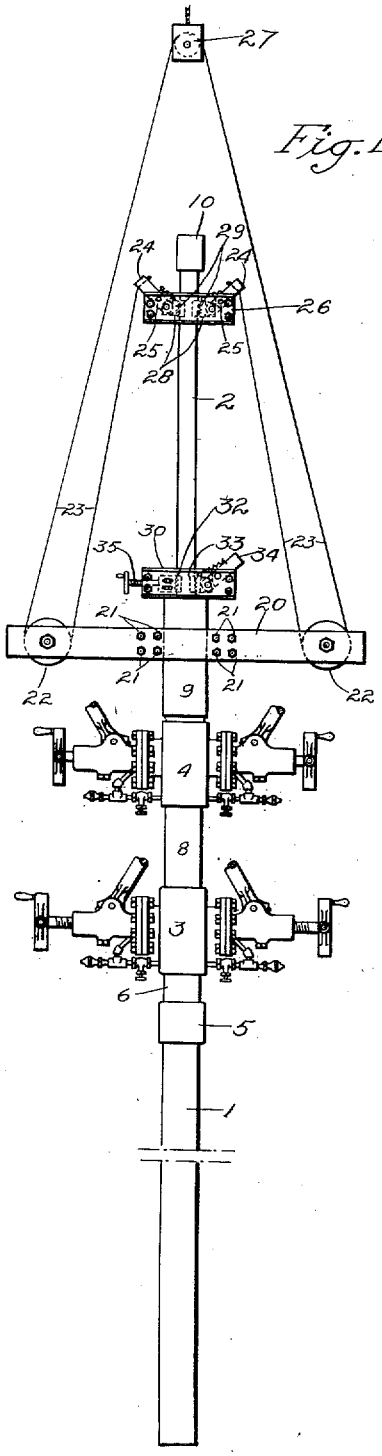
Fig. 1 is a side elevation of an apparatus, designed to carry out the process.
Figure 3:
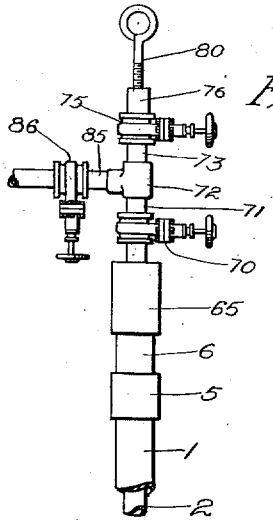
Fig. 3 is a side elevation of an operating head adapted to be placed on the top of the well casing and the string of tubing after the latter has been inserted in the former.

Referring to the drawings, 1 illustrates a well casing which has been previously inserted into a well in the usual manner. 2 illustrates a string of tubing being lowered or forced down into the well casing 1, against the high pressure existing therein.

To prevent the escape of gas or oil from the upper end of the casing 1 around the tubing 2, a pair of control heads 3 and 4 of the type illustrated in my co-pending application Serial No. 319,865 filed November 16, 1928, are provided on the upper end of the casing 1.

The well casing 1 consists of a plurality of lengths of ordinary piping coupled together by the usual form of straight couplings, one of which is shown at 5 at the upper end of the well casing 1.

The control head 3 is secured to the coupling 5 by a nipple 6 having an annular shoulder 7 formed on its inner surface, for purposes hereinafter set forth.

The control head 4 is secured to the control head 3 by means of a nipple 8, and secured to and extending above the upper side of the control head 4 is a nipple or other substantially cylindrical fitting 9.

The string of tubing 2 consists primarily of a plurality of lengths of ordinary piping, of lesser diameter than the casing 1, and these pipe sections are connected together in the usual manner by straight couplings 10. The string of tubing 2 also contains a foot plug 11, a perforated section 12, and a temporary sealing device 13, which will be more fully described hereinafter.

Each of the control heads, 3, 4, comprises a pair of movable jaws or pistons 15, 15, which are adapted to be moved into contact with the tubing 2, as illustrated within the control head 4, or to be moved to an outer position, free of the tubing 2, as illustrated within the control head 3, so that the pipe connections 10 and appliances, such as the sealing device 13, may be passed through the control heads. At no time, however, are the jaws of both of the control heads out of contact with the tubing.

Secured to the fitting 9 of the well casing 1 is a cross-arm 20 which, in the present instance, consists of a pair of similar beams located at opposite sides of the fitting 9 and clamped thereto by means of bolts 21, 21, above the control head 4.

Rotatably mounted on the cross-arm 20 are sheave wheels 22, 22, around which passes a cable 23. The opposite ends of the cable 23 are secured to the outer ends of snubbing levers 24, 24, respectively, which are pivotally mounted at 25 in a carrier 26 which is slidably mounted on the tubing 2, above the fitting 9, of the well casing 1. The cable 23 passes over a sheave located in a traveling block 27, or two cables may be used with their ends rigidly secured to the traveling block 27. The single cable, however, provides for equalization of the pressure applied to the snubbing levers 24, 24.

On the inner ends of the snubbing levers 24, 24 are pivotally mounted snubbing shoes 28, 28 which engage the tubing 2 and which are provided with teeth 29. The snubbing device is covered per se in my co-pending application Serial No. 395,314, filed September 26, 1929.

Raising of the traveling block 19 will cause the teeth 29 of the snubber shoes 28 to grip the tubing 2, and force it down into the casing 1, against the pressure therein, until the carrier 26 closely approaches the upper end of the fitting 9.

On the upper end of the fitting 9 is secured a cross-head 30 which is provided with a substantially fixed snubber shoe 32 and a relatively movable snubber shoe 33, respectively toothed in the same manner as the snubber shoes 28, 28. The movable snubber shoe 33 is pivotally mounted on the inner end of a lever 34 which in turn is pivotally mounted on the cross-head 30. When the outer end of the lever 34 is pressed downwardly by means of a weight, spring, or manually operable lever bar, not shown, the shoes 32 and 33 will cooperate to hold the tubing 2 against vertical movement upward with respect to the casing while the traveling snubber shoes 28, 28 are being raised along the tubing 2 for the purpose of obtaining a new purchase on the said tubing.

The relatively fixed snubber 32 can be moved away from the tubing for the purpose of permitting the couplings 10, or other protuberances on the tubing 2 to pass, by backing off the screw 35, after which the said fixed snubber is again set up into contact with the tubing 2.

In order to prevent the gas from escaping through the tubing 2 itself, during the inserting of the tubing into the casing, the temporary sealing device 13 is provided. This device is covered per se in my co-pending application Serial No. 395,313, filed September 26, 1929.

The temporary sealing device 13 comprises an outer sleeve 40 adapted to be threaded onto the tubing 2. The outer sleeve 40 is provided with an annular shoulder 41 on which rests a relatively brittle element, such as a cast iron disk 42, the disk being held tightly between the shoulder 41 and the end of one of the sections of tubing 2, which is screwed into the outer sleeve 40, and a packing element of any desired form being provided between the end of the tubing and the disk, or between the disk and the shoulder to prevent the escape of fluid under pressure around the disk.

The sealing device 13 also comprises an inner sleeve 45 which is adapted to be threaded into one of the couplings 10 of the string of tubing 2 or which may form the upper end of the screen section 12 as illustrated in the drawings. Axial movement of the outer sleeve 40 into a seal breaking position relative to the inner sleeve 45 may be normally prevented by a shear pin, not shown, or by means hereinafter set forth.

In the present instance, the inner sleeve 45 is provided with suitable lugs, such as the heads of the screws 47, the said screws being threaded into the inner sleeve 45 with their heads disposed in vertically extending slots 48 formed in the outer sleeve 40.

In the upper end of the inner sleeve 45 is a pin or knife blade 50 which lies immediately below the cast iron disk 42, and which is adapted to break the sealing disk 42 under conditions which will be hereinafter set forth.

Figure 2:
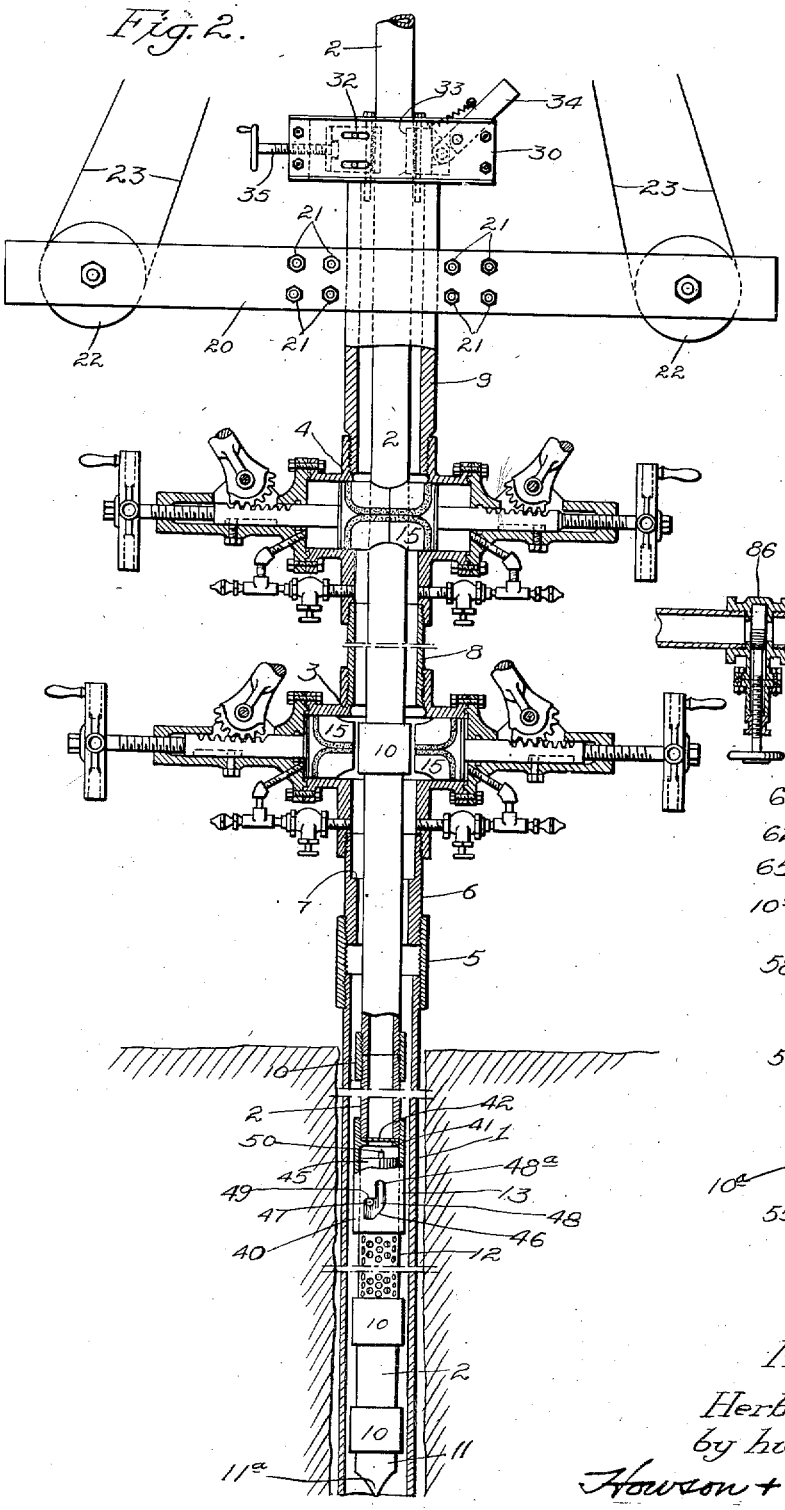
Fig. 2 is an enlarged sectional elevation of a portion of the apparatus.

The slots 48 are provided with shoulders 49 against which the lugs 47 are adapted to bear as shown in Fig. 2. The slots 48 are provided with inclined portions 46 which normally guide the lugs 47 under the shoulders 49, when the inner sleeve 45 is permitted to drop relative to the outer sleeve 40.

The string of tubing 2 is forced down into the well casing 1 against the pressure of the gas or other fluid existing in the well casing, by the block 27 being raised and thereby exerting a pull on the cables 23, 23, which in turn exert a pressure on the snubbing shoes 28, 28, forcing them into gripping contact with the tubing and thereby forcing the tubing into the well, the holding snubbers 32 and 33 being operated to hold the tubing against being forced out of the casing while the snubbers 28, 28 are being moved upwardly along the tubing to obtain a new grip thereon, the control heads being operated to permit the couplings, etc., to pass through as the tubing is being lowered into the well casing.

It is pointed out that the snubbing levers 24, through the agency of the snubbing shoes 28 will apply a laterally balanced pressure to the tubing 2. This pressure will be applied longitudinally of said tubing which will force the tubing into the casing in short steps.

After a certain amount of the tubing has been lowered into the well, through the casing, the weight of the tubing exceeds the pressure of the fluid existing in the well, after which the tubing will pass into the well of its own weight, being lowered by any suitable tackle and suitable drawbacks for controlling its passage into the well.

When the foot plug 11 reaches the bottom of the well, a measurement is taken from the top of the string of tubing, as it stands with the foot plug resting on the bottom of the well, to the shoulder 7 in the fitting 6, whereupon the tubing is raised exposing above the top of the fitting 9 a greater amount of the tubing than the measurement taken. The measurement which has been taken is then laid out and a mark made on the tubing to show just how far from the top of the tubing the shoulder 7 is spaced, when the tubing is standing in the well with the foot plug 11 resting on the bottom of the well.

At a predetermined point below the above mentioned mark on the tubing the tubing is cut and threaded, while still above the fitting 9.

Figure 4:
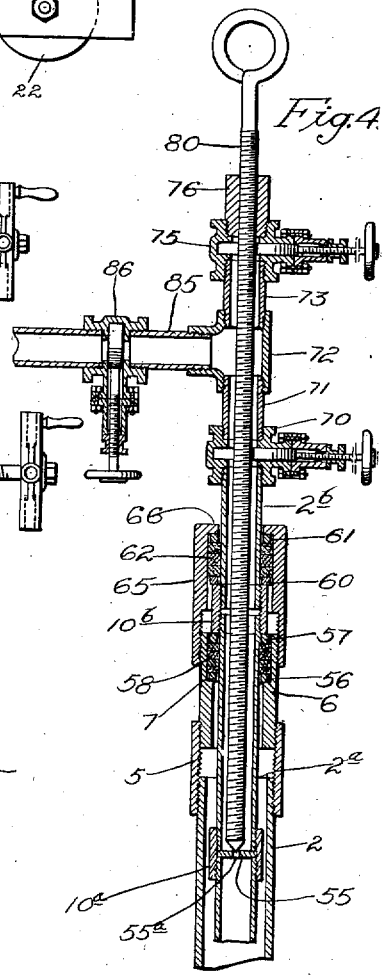
Fig. 4 is a sectional elevation of the device shown in Fig. 3.

On this projecting threaded end of the tubing is then placed a coupling 10*a*, which is shown in Fig. 4. A second disk 55 is then placed within the coupling, resting on the said threaded end of the tubing while the same still extends above the fitting 9. A section of pipe 2*a* of predetermined length is then threaded into the coupling 10*a* and the end of the pipe 2*a* rests against the disk 55, holding it firmly against the above mentioned end of the tubing 2.

Around the pipe section 2*a* is then placed a pair of steel rings 56 and 57 between which are located a series of packing rings 58, 58, after which another coupling 10*b* is threaded on to the free end of the tubing section 2*a*, above the rings and packing.

A section of tubing 2*b* of any desired length is then threaded into the coupling 10*b*.

The string of tubing is then again lowered into the well casing until the foot plug 11 rests on the bottom of the well and the rings 56 and 57 and the packing 58 are received in the fitting 6. This foot plug 11 has a beveled edge 11*a* which presses into the bottom of the well and acts to prevent rotation of the lower portion of the string of tubing, that is the portion up as far as the inner sleeve 45 of the temporary seal 13.

After the foot plug 11 has been forced into gripping contact with the bottom of the well, the upper portion of the string of tubing, that is all above and including the outer sleeve 40 of the temporary sealing device 13, is turned until the shoulders 49 in this outer sleeve 40 ride off the lugs 47 carried by the inner sleeve 45, of the temporary sealing device 13, the lugs passing into the upper portions 48*a* of the slots 48 formed in the outer sleeve 40.

Axial movement of the said upper portion of the string of tubing is then permitted relative to the said lower portion thereof, and this relative axial movement causes the element 50 to engage the sealing disk 42. Downward pressure on the upper portion of the string of tubing causes the element 50 to break the disk 42, whereupon the fluid under pressure entering the string of tubing through the perforated section 12 thereof flows upwardly through the tubing to the upper disk 55, where the flow of fluid is choked thereby.

This disk 55 has a small opening 55*a* which permits a relatively small amount of the fluid under pressure to pass upwardly through the tubing section 2*b* giving a signal that the lower sealing disk 42 has been broken.

The axial movement of the upper portion of the string of tubing 2 which effected the breaking of the disk 42 also provides sufficient movement to permit the ring 56 to seat on the shoulder 7 of the fitting 6, whereafter the weight of the tubing causes the coupling 10*b* to press on the ring 57 which expands the packing rings 58 into sealing contact with the inner wall of the fitting 6 above the shoulder 7 thereof.

This sealing by the rings 58 prevents the leakage of fluid under pressure upwardly through the casing 1 around the tubing 2.

The control heads 3 and 4 and all the other apparatus located above the fitting 6 are then removed, for use in other places, leaving the tubing section 2*b* projecting above the top of the fitting 6.

A pair of steel rings 60 and 61 with a series of packing rings 62 therebetween is then placed on the projecting tubing section 2*b*. A cap 65 having an internal flange 66 is then placed on the section of tubing 2*b*. This cap is threaded at its end opposite the internal flange and these threads cooperate with threads on the upper end of the fitting 6, whereby the cap 65 may be screwed down on the fitting 6, the flange 66 engaging the steel ring 61 which in turn engages the packing rings 62. The packing rings 62 rest on the steel ring 60, which in turn rests on the upper end of the coupling 10*b*.

As the cap 65 is screwed down tightly onto the fitting 6 a fluid tight seal is formed between the casing 1 and the tubing 2 and the tubing 2 is held against any vertical movement which may occur and which would break the said seal.

A gate valve 70 is then threaded into the upper end of the section of tubing 2*b*, a nipple 71 being threaded into the upper end of the valve and which in turn receives a T-fitting 72. A nipple 73 is threaded into the T-fitting 72 in line with the nipple 71 and on the upper end of the nipple 73 is secured a second gate valve 75.

Into the upper end of the gate valve 75 is threaded, or otherwise secured, a plug 76 having an internally threaded aperture adapted to receive a threaded rod 80.

This rod 80 projects downwardly through the plug 76, valve 75, nipple 73, T-fitting 72, nipple 71, valve 70, tubing section 2*b*, coupling 10*b*, and tubing section 2*a* to a point adjacent the disk 55, the rod having a pointed end adapted to enter the opening 55*a* in the disk 55 to close the same.

Into the third outlet of the T-fitting 72 a pipe line 85 is connected having a valve 86 by which the flow of fluid from the tubing 2 into the pipe line 85 may be controlled.

The rod 80 is then turned until sufficient pressure is brought to bear on the disk 55 to break the same whereupon the main flow of fluid is permitted through the tubing 2 into the pipe line 85.

The rod 80 is then turned so that it is backed out of the plug 76, the valve 75 being closed as soon as the pointed end of the rod 80 passes the gate of this valve, thereby preventing escape of fluid through the plug 76 after the rod 80 is entirely removed therefrom.

The valve 70 is provided to control the flow of fluid directly in the string of tubing, after the rod 80 has been removed, so that any desired arrangement of piping may be coupled to the string of tubing after the above operations have been carried out.

Prior to my invention it has been impossible to set tubing in some well casings due to the high pressures of the fluids existing in these wells. Any attempts to tube such wells have proven disastrous, and in many instances fatal to those making the attempt, due to the tubing and apparatus employed being literally blown out of the casing.

With the apparatus and method above described, I have successfully tubed wells in which the pressure of the fluids contained therein have exceeded one thousand pounds per square inch without accident or injury to the workmen, and without loss of oil or gas.

I claim:

1. A process for inserting tubing into well casings containing fluid under high pressures, said process comprising the application of force to the tubing tending to force the tubing into the well casing, snubbing the tubing to prevent its movement out of the casing under the influence of said high pressures, forming a temporary seal within the tubing to prevent the escape of said fluid from the casing through the tubing, forming a choke in the tubing after the tubing has been lowered into the casing, breaking the said temporary seal in the tubing to permit the fluid under pressure to flow therethrough to the choke, and subsequently breaking the choke to permit a full flow of said fluid through the tubing.

2. A process for inserting tubing into well casings containing fluid under high pressures, said process comprising the application of force to the tubing tending to force the tubing into the well casing, snubbing the tubing to prevent its movement out of the casings under the influence of said high pressures, forming a temporary seal within the tubing to prevent the escape of said fluid from the casing through the tubing, forming a temporary seal between the tubing and the casing to prevent the escape of said fluid from the casing around the tubing, forming a choke in the tubing after the tubing has been lowered into the casing, breaking the said temporary seal in the tubing to permit the fluid under pressure to flow therethrough to the choke, forming a permanent seal between the casing and the tubing to prevent the escape of said fluid around the outside of the tubing, removing the said temporary seal previously formed between the casing and the outside of the tubing, and subsequently breaking the choke to permit a full flow of said fluid through the tubing.

3. A process for inserting tubing into well casings containing fluid under high pressures, said process comprising the application of force to the tubing tending to force the tubing into the well casing, snubbing the tubing to prevent its movement out of the casings under the influence of said high pressures, forming a temporary seal within the tubing to prevent the escape of said fluid from the casing through the tubing, forming a temporary seal between the tubing and the casing to prevent the escape of said fluid from the casing around the tubing, forming a choke in the tubing after the tubing has been lowered into the casing, breaking the said temporary seal in the tubing to permit the fluid under pressure to flow therethrough to the choke, forming a permanent seal between the casing and the tubing to prevent the escape of said fluid around the outside of the tubing, removing the said temporary seal previously formed between the casing and the outside of the tubing, piping the tubing above the said permanent seal for controlling the fluid to pass through the tubing, and subsequently breaking the choke to permit a full flow of said fluid through the tubing.

4. The method of inserting tubing in well casing containing fluid under high pressures, consisting in temporarily sealing the lower end of the tubing, forcing the same into the well, inserting a choke in the tubing above the seal, breaking the temporary seal and then breaking the choke.

5. The method of inserting a string of coupled sections of tubing into a well casing containing fluid under high pressure, consisting in sealing the lower end of the tubing and intermittently forcing the tubing into the casing in short steps by laterally-balanced pressure applied longitudinally of the tubing through positive gripping means applicable to the tubing sections intermediate the ends thereof.

6. The method of inserting a string of coupled sections of tubing into a well casing containing fluid under high pressure, consisting in sealing the lower end of the tubing and intermittently forcing the tubing into the casing in short steps by laterally-balanced pressure applied longitudinally of the tubing through positive gripping means applicable to the tubing sections intermediate the ends thereof, placing a choke in the tubing adjacent the upper end thereof, breaking the seal of the lower end of the tubing and subsequently removing said choke.

7. The method of inserting a string of coupled sections of tubing into a well casing containing fluid under high pressure, consisting in sealing the lower end of the tubing with a seal breakable upon an operation of the tubing abnormal to insertion thereof, intermittently forcing the tubing into the casing in short steps by laterally-balanced pressure applied longitudinally of the tubing, and performing said operation to break said seal.

8. The method of inserting a string of coupled sections of tubing into a well casing containing fluid under high pressure, consisting in sealing the lower end of the tubing with a seal breakable upon an operation of the tubing abnormal to insertion thereof, intermittently forcing the tubing into the casing in short steps by laterally-balanced pressure applied longitudinally of the tubing, inserting a choke in the upper end of the casing, performing said operation to break said seal, and finally removing said choke.

9. In apparatus for tubing wells against high pressure in the well, a tubing having a seal at its lower end breakable upon an operation of the tubing abnormal to insertion thereof, and a choke in the tubing adjacent the upper end thereof.

10. Apparatus for tubing wells against high pressures, comprising a tubing to be inserted in a well casing, the tubing having a seal at its lower end breakable upon an operation of the tubing abnormal to insertion, said tubing comprising coupled sections, means to engage said sections intermediate the ends thereof and apply laterally-balanced longitudinally-directed pressure to the tubing to force the same into the well, and means to snub the tubing to prevent its movement out of the casing under the influence of high pressures.

11. Apparatus for tubing wells against high pressures, comprising a tubing to be inserted in a well casing, the tubing having a seal at its lower end breakable upon an operation of the tubing abnormal to insertion, said tubing comprising coupled sections, means to engage said sections, means to engage said sections intermediate the ends thereof and apply laterally-balanced longitudinally-directed pressure to the tubing to force the same into the well, means to snub the tubing to prevent its movement out of the casing under the influence of high pressures, a choke in the tubing at the upper end thereof, and means to break said seal while said choke is in position in the tubing.

12. The method of inserting a string of tubing into a well containing fluid under high pressure consisting in, forming a seal with the tubing to prevent the escape of the high pressure fluid from the casing through said tubing, sealing between the upper portion of the tubing and the casing to prevent the escape of high pressure fluid therebetween, applying force to the tubing tending to force it downwardly into the well casing, snubbing said tubing to prevent its movement out of the casing under the influence of said high pressure fluid, permanently sealing between the tubing and the casing at a point below but adjacent to the first casing seal while said casing seal is still effective and then removing the first casing seal.

13. The method of inserting a string of tubing into a well containing fluid under high pressure consisting in, forming a seal with the tubing to prevent the escape of the high pressure fluid from the casing through said tubing, sealing between the upper portion of the tubing and the casing to prevent the escape of the high pressure fluid therebetween, applying force to the tubing tending to force it downwardly into the well casing, snubbing said tubing to prevent its movement out of the casing under the influence of said high pressure fluid, opening the tubing seal to permit the fluid to flow from the casing into said tubing, and permanently sealing between the tubing and the casing at a point below but adjacent to the first casing seal while said casing seal is still effective.

14. The method of inserting a string of tubing into a well containing fluid under high pressure consisting in, forming a seal with the tubing to prevent the escape of the high pressure fluid from the casing through said tubing, sealing between the upper portion of the tubing and the casing to prevent the escape of the high pressure fluid therebetween, applying force to the tubing tending to force it downwardly into the well casing, snubbing said tubing to prevent its movement out of the casing under the influence of said high pressure fluid, continuing forcing the tubing into the casing against the pressure of the fluids therein until a sufficient length of tubing has been inserted into the well whereby its own weight will continue to carry it down the casing, then continuing to insert tubing until the desired length has been placed in the casing, then permanently sealing between the tubing and the casing at a point below but adjacent to the first casing seal while said casing seal is still effective, and then removing the first casing seal.

15. The method of inserting a string of coupled sections of tubing into a well casing containing fluid under high pressure, consisting in forming a temporary seal between the tubing and the casing, sealing the lower portion of the tubing to prevent the escape of high pressure fluids from the casing therethrough, intermittently forcing the tubing into the casing in short steps by laterally-balanced pressure applied longitudinally of the tubing through positive gripping means applicable to the tubing sections intermediate the ends thereof, permanently sealing between the tubing and the casing at a point below the temporary seal while said temporary seal is still effective, and subsequently removing the temporary seal.

16. The method of inserting a string of tubing into a well casing containing fluid under high pressure consisting in, sealing the tubing to prevent the escape of the high pressure fluids from the casing through the tubing, sealing the upper portion of the tubing with the upper portion of the casing to prevent the escape of high pressure fluids from the casing, snubbing the tubing into the casing against the well pressure, permanently sealing between the tubing and the casing at a point beneath the last named seal while said seal is still effective, and then removing the upper seal.

17. The method of inserting a string of tubing into a well casing containing fluid under high pressure consisting in, sealing the tubing to prevent the escape of the high pressure fluids from the casing through the tubing, sealing the upper portion of the tubing with the upper portion of the casing to prevent the escape of high pressure fluids from the casing, snubbing the tubing into the casing against the well pressure, breaking the seal at the lower portion of the tubing permanently sealing between the tubing and the casing at a point beneath the last named seal while said seal is still effective.

HERBERT C. OTIS.